(12) United States Patent
Samar

(10) Patent No.: US 7,315,859 B2
(45) Date of Patent: Jan. 1, 2008

(54) METHOD AND APPARATUS FOR MANAGEMENT OF ENCRYPTED DATA THROUGH ROLE SEPARATION

(75) Inventor: Vipin Samar, Cupertino, CA (US)

(73) Assignee: Oracle International Corp., Redwood Shores, CA (US)

( * ) Notice: Subject to any disclaimer, the term of this patent is extended or adjusted under 35 U.S.C. 154(b) by 345 days.

(21) Appl. No.: 09/741,680

(22) Filed: Dec. 15, 2000

(65) Prior Publication Data
US 2002/0078049 A1 Jun. 20, 2002

(51) Int. Cl.
*G06F 17/30* (2006.01)
(52) U.S. Cl. ............................. 707/9; 726/2
(58) Field of Classification Search ................ 707/9; 726/2; 713/166, 182
See application file for complete search history.

(56) References Cited

U.S. PATENT DOCUMENTS

| | | | | |
|---|---|---|---|---|
| 5,572,673 A * | 11/1996 | Shurts | ........................ | 713/200 |
| 5,894,521 A * | 4/1999 | Conley | ........................ | 380/54 |
| 5,983,350 A * | 11/1999 | Minear et al. | .............. | 713/151 |
| 6,023,765 A * | 2/2000 | Kuhn | ........................ | 713/166 |
| 6,105,027 A * | 8/2000 | Schneider et al. | ............ | 707/9 |
| 6,105,132 A * | 8/2000 | Fritch et al. | ................ | 713/167 |
| 6,131,090 A * | 10/2000 | Basso et al. | ................... | 706/23 |
| 6,202,066 B1 * | 3/2001 | Barkley et al. | ................ | 707/9 |
| 6,275,824 B1 * | 8/2001 | O'Flaherty et al. | ........... | 707/9 |
| 6,321,201 B1 * | 11/2001 | Dahl | ............................. | 705/1 |
| 6,336,114 B1 * | 1/2002 | Garrison | ........................ | 707/9 |
| 6,336,121 B1 * | 1/2002 | Lyson et al. | ................ | 707/201 |
| 6,412,070 B1 * | 6/2002 | Van Dyke et al. | .......... | 713/200 |
| 6,643,648 B1 * | 11/2003 | Ross et al. | ..................... | 707/9 |
| 2002/0031230 A1 * | 3/2002 | Sweet et al. | ................ | 380/278 |
| 2002/0053020 A1 * | 5/2002 | Teijido et al. | .............. | 713/153 |

OTHER PUBLICATIONS

U.S. Patent Application, entitled "Database Fine-Grained Access Control," to Chon Hei Lei and Douglas James McMahon, Filed Oct. 5, 1998, U.S. Appl. No. 09/167,092.

* cited by examiner

*Primary Examiner*—Cam Linh Nguyen
(74) *Attorney, Agent, or Firm*—Park, Vaughan & Fleming LLP

(57) ABSTRACT

A system is provided for managing a database that stores sensitive information. Upon receiving a command to perform a function involving a database object, the system determines if the object is a sensitive object. If the object is not a sensitive object, the system allows the function to proceed. If the object is a sensitive object and the command is received from a normal system administrator, the system disallows the function. Upon receiving a request to perform an operation on sensitive data in the database system received from a user with access rights to the data item and empowered to access sensitive data, the system allows the operation to proceed. If the request is received from a normal user for a sensitive data item, the system disallows the operation. If the operation involves retrieval of a sensitive data item, the system decrypts the data item using an encryption key.

18 Claims, 3 Drawing Sheets

METHOD AND APPARATUS FOR MANAGEMENT OF ENCRYPTED DATA THROUGH ROLE SEPARATION

BACKGROUND

1. Field of the Invention

The present invention relates to security in computerized database systems. More specifically, the present invention relates to a method and an apparatus for managing a database system that provides the capability to encrypt and decrypt items in the database.

2. Related Art

Database systems are often used to store sensitive data, such as salary information, which needs to be kept confidential. Ensuring that such information remains confidential is becoming increasingly harder as computer systems are more commonly interconnected through computer networks. If a computer system is connected to a computer network, such as the Internet, hackers from any continent can potentially break into it. Once hackers break in, they can potentially steal sensitive data from the computer system.

Sensitive data can be protected by storing the sensitive data in encrypted form on a database system. In this way, only an entity that possesses the proper encryption/decryption key can access the sensitive data.

One method of encrypting sensitive data is to allow an application that accesses a database to encrypt the sensitive data before it is stored in the database. Under this method, only the application that accesses the sensitive data possesses the encryption key. Hence, even a system administrator for the database is not able to decrypt the data.

Unfortunately, if the application itself encrypts the data, the database system will not be able to perform queries on the encrypted data because the database system will not be able to decrypt the data. Hence, many of the benefits of using a database system will be lost.

Another method of encrypting sensitive data is to let the database system manage encryption keys in order to perform encryption and decryption of data. This method allows the database system to perform queries on encrypted data. However, it also makes the encrypted data accessible to a number of database system administrators, who may not be trustworthy. Note that supporting a database system that is available 24 hours per day and seven days a week requires at least five or six system administrators. Any one of these system administrators can potentially compromise the security of encrypted data on the database system.

What is needed is a method and an apparatus for managing a database system that provides the capability to store sensitive data in encrypted form, while minimizing the number of database administrators who can access the encrypted data.

SUMMARY

One embodiment of the present invention provides a system for managing a database that stores sensitive information. Upon receiving a command to perform an administrative function involving an object defined within the database system, the system determines if the object is a sensitive object that is associated with security functions in the database system. If the object is not a sensitive object, and if the command is received from a normal database administrator, the system allows the administrative function to proceed. On the other hand, if the object is a sensitive object, and if the command is received from a normal system administrator, the system disallows the administrative function.

In one embodiment of the present invention, the system additionally receives a request to perform an operation on a data item in the database system. If the data item is a sensitive data item containing sensitive information, and if the request is received from a sensitive user who is empowered to access sensitive data, the system allows the operation to proceed if the sensitive user has access rights to the data item. Otherwise, if the data item is a sensitive data item and the request is received from a normal user, the system disallows the operation.

In one embodiment of the present invention, if the data item is a sensitive data item, if the operation is allowed to proceed, and if the operation involves retrieval of the data item, the system decrypts the data item using an encryption key after the data item is retrieved. In a variation on this embodiment, this encryption key is stored along with a table containing the data item. Note that this encryption key is preferably stored in encrypted form.

In one embodiment of the present invention, the sensitive object can include a sensitive table in the database system containing sensitive data. The sensitive object can also include a sensitive row within a table in the database system, wherein the sensitive row contains sensitive data. The sensitive object can also include an object that represents a sensitive user of the database system who is empowered to access sensitive data.

In one embodiment of the present invention, if the object is not a sensitive object, and if the command to perform the administrative function is received from a security officer, the system additionally allows the security officer to perform the administrative function on the object.

In one embodiment of the present invention, the database system includes a number of sensitive data items, and only specific sensitive users are allowed to access a given sensitive data item.

In one embodiment of the present invention, there are: fewer sensitive data items than normal data items; fewer sensitive users than normal users; and fewer security officers than normal database administrators.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Distributed Computing System

Figure 1:
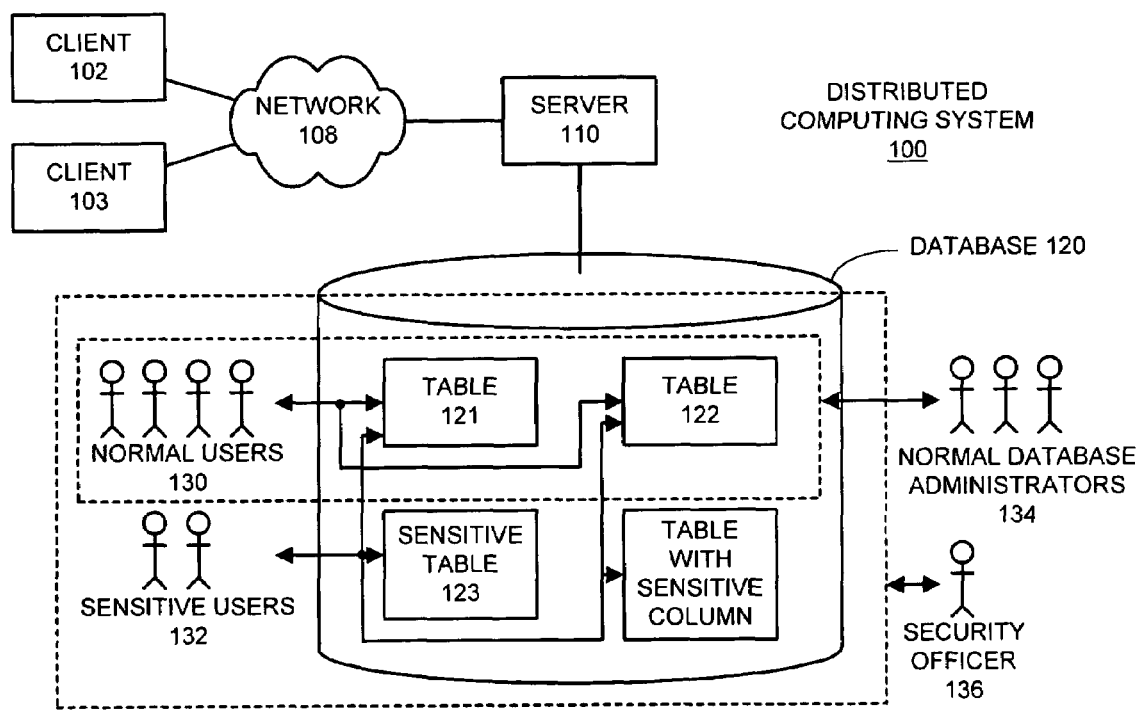
FIG. 1 illustrates a distributed computing system in accordance with an embodiment of the present invention.

FIG. 1 illustrates a distributed computing system 100 in accordance with an embodiment of the present invention. Distributed computing system 100 includes clients 102-103, which are coupled to server 110 through network 108.

Network 108 can generally include any type of wire or wireless communication channel capable of coupling together computing nodes. This includes, but is not limited to, a local area network, a wide area network, or a combination of networks. In one embodiment of the present invention, network 108 includes the Internet.

Clients 102-103 can generally include any node on a network including computational capability and including a mechanism for communicating across network 108 to server 110. More specifically, clients 102-103 can execute user applications that make requests to server 110, which accesses database 120. These applications include applications executed on behalf of normal users 130 or sensitive users 132. Moreover, clients 102-103 can be operated by system administrators, such as normal database administrators 134 or security officer 136. These system administrators issue commands from clients 102-103 to perform system administration functions on database 120 as is described in more detail below with reference to FIGS. 2-4.

Server 110 can generally include any computational node including a mechanism for servicing requests from a client for computational and/or data storage resources. More specifically, server 110 is a database server that facilitates accesses to database 120 by clients 102-103.

Server 110 is attached to database 120. Database 120 can include any type of system for storing data in non-volatile (and possibly volatile) storage. This includes, but is not limited to, systems based upon magnetic, optical, and magneto-optical storage devices, as well as storage devices based on flash memory and/or battery-backed up memory.

Database 120 includes tables 121-124 containing data that can be accessed by normal users 130 and sensitive users 132 of database 120. More specifically, tables 121-122 contain data that is not encrypted, and can be accessed by any users of database 120 that have access rights to tables 121-122. In contrast, tables 123-124 contain sensitive data that is stored in encrypted form. Note that all of the data within sensitive table 123 is encrypted, whereas only a single sensitive column within table 124 is encrypted.

During operation of database system 120, a large group of normal users 130 can access to a large number of tables that are not encrypted, such as tables 121 and 122. At the same time, a smaller group of sensitive users 132 have access to a smaller number of tables containing sensitive data, such as tables 123-124.

Furthermore, a number of normal database administrators 134 can perform administrative functions for normal users 130 and tables that are not encrypted 121-122. While a smaller number of security officers, such as security officer 136, can perform administrative functions for sensitive users 132 and tables containing sensitive information 124.

For example, suppose only 2% of the users are sensitive users and only 2% of the tables contain sensitive data. In this case, far less system administration activity is required to administer sensitive users and sensitive tables. Hence, only a small number of system administrators, such as security officer 136, are needed to access the sensitive data. This reduces security problems that arise from allowing a large number of system administrators to have access to sensitive information.

Note that security officer 136 can also perform administrative operations for normal users 130 and tables that are not encrypted 121-122. Also note that these administrative functions can generally include any database administrative function, such as adding a new user, restoring an older version of a table, or looking up a forgotten password.

In a typical database implementation, all user information is kept inside a user table, and access to the user table is given to the system administrators. In a similar fashion, all information about different tables is maintained in a data dictionary table, wherein the appropriate access rights are given.

One way to implement the present invention is to use known techniques for implementing "virtual private databases" to allow access to certain tables to security officers only. Note that using virtual private database technology allows the old applications to run without any modification.

If the object is a sensitive object, then the present invention does not allow any accesses (including read accesses) to the object from normal users 130. However, in the case of user management, normal database administrators 134 can access sensitive users 132, but they cannot change any of the attributes attached to sensitive users 132.

For comprehensive security, it is important that access be limited to both the sensitive users 132 as well as to sensitive objects. If this were not done, a rogue administrator can potentially become a sensitive user, and can thereby obtain access to sensitive objects indirectly. Hence, in order to operate effectively, the present invention must be able to control both sensitive users and sensitive objects. Hence, any add/delete/modify operations on any of the sensitive user information can be done only by the security officer 136.

Note that although the present invention is described in the context of a distributed computing system, the present invention can generally be applied to any computing system that includes a database, and is not meant to be limited to distributed computing system. Furthermore, note that although the present invention is described in the context of a relational database system that stores data in tables, the present invention can generally be applied to any type of database system, and is not meant to be limited to database systems that store data in tables.

Process of Encrypting Data

Figure 2:
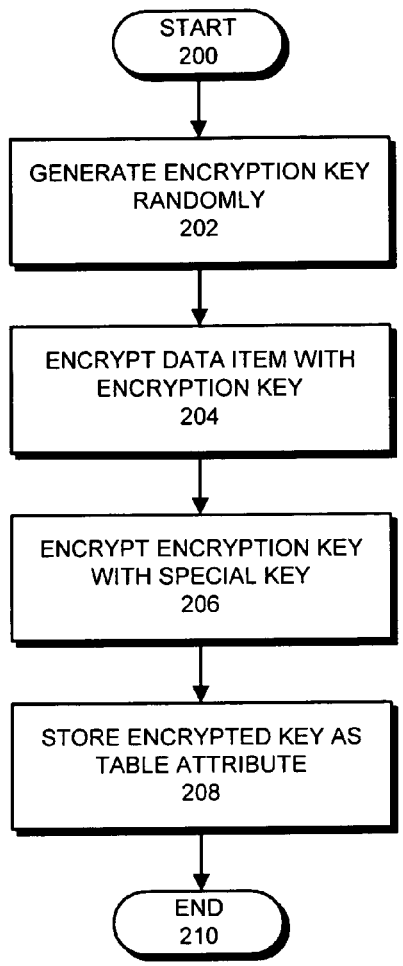
FIG. 2 is a flow chart illustrating how data is encrypted in accordance with an embodiment of the present invention.

FIG. 2 is a flow chart illustrating how data is encrypted in accordance with an embodiment of the present invention. The system starts by randomly generating or otherwise obtaining an encryption key (step 202). Next, the system encrypts the data using the encryption key (step 204), and stores the data within a table in database 120.

This encryption key is itself encrypted with a special key (step 206), and this encrypted encryption key is stored as a table attribute (step 208). Note that storing the encrypted encryption key along with the table eliminates the need for a separate data structure to store encryption keys. Also note that security officer 136 has access to the special key, but normal database administrators 134 do not. Hence, normal database administrators 134 cannot access the sensitive data. Furthermore, the special key is generally stored in a secure manner, such as on a smart card or in encrypted form on a local file system.

Process of Performing Database Administrative Functions

Figure 3:
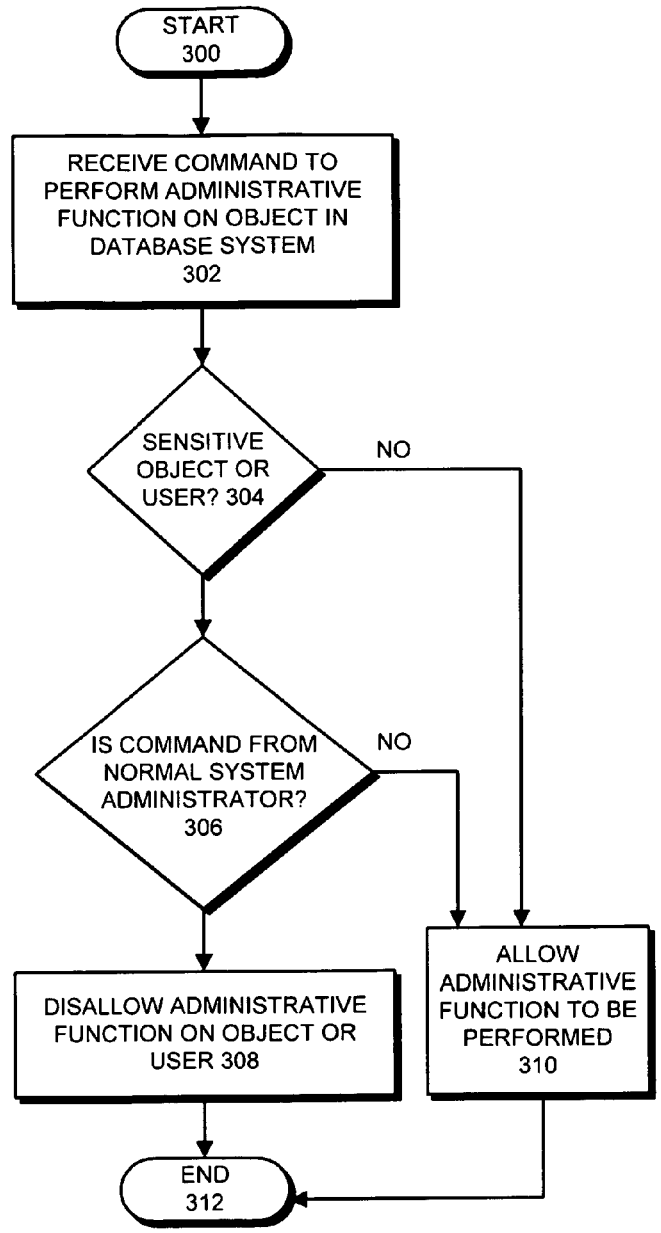
FIG. 3 is a flow chart illustrating how database administrative functions are selectively performed in accordance with an embodiment of the present invention.

FIG. 3 is a flow chart illustrating how database administrative functions are selectively performed in accordance with an embodiment of the present invention. The system starts by receiving a command to perform an administrative function on an object (or user) within database 120 (step 302). Note that this object can include any object defined within database 120, such as a table or an object representing a user. Next, the system determines if the object is a sensitive object, such as an encrypted table or an object representing a sensitive user (step 304). If so, the system additionally determines whether the command as received from one the normal database administrators 134, or from security officer 136 (step 306). If the command is received from one of the normal database administrators 134, the system disallows the administrative function on the sensitive object (or user) (step 308).

Otherwise, if the object (or user) is not a sensitive object or if the command is from security officer 136, the system allows the administrative function to be performed (step 310).

Process of Performing Database Operations

Figure 4:
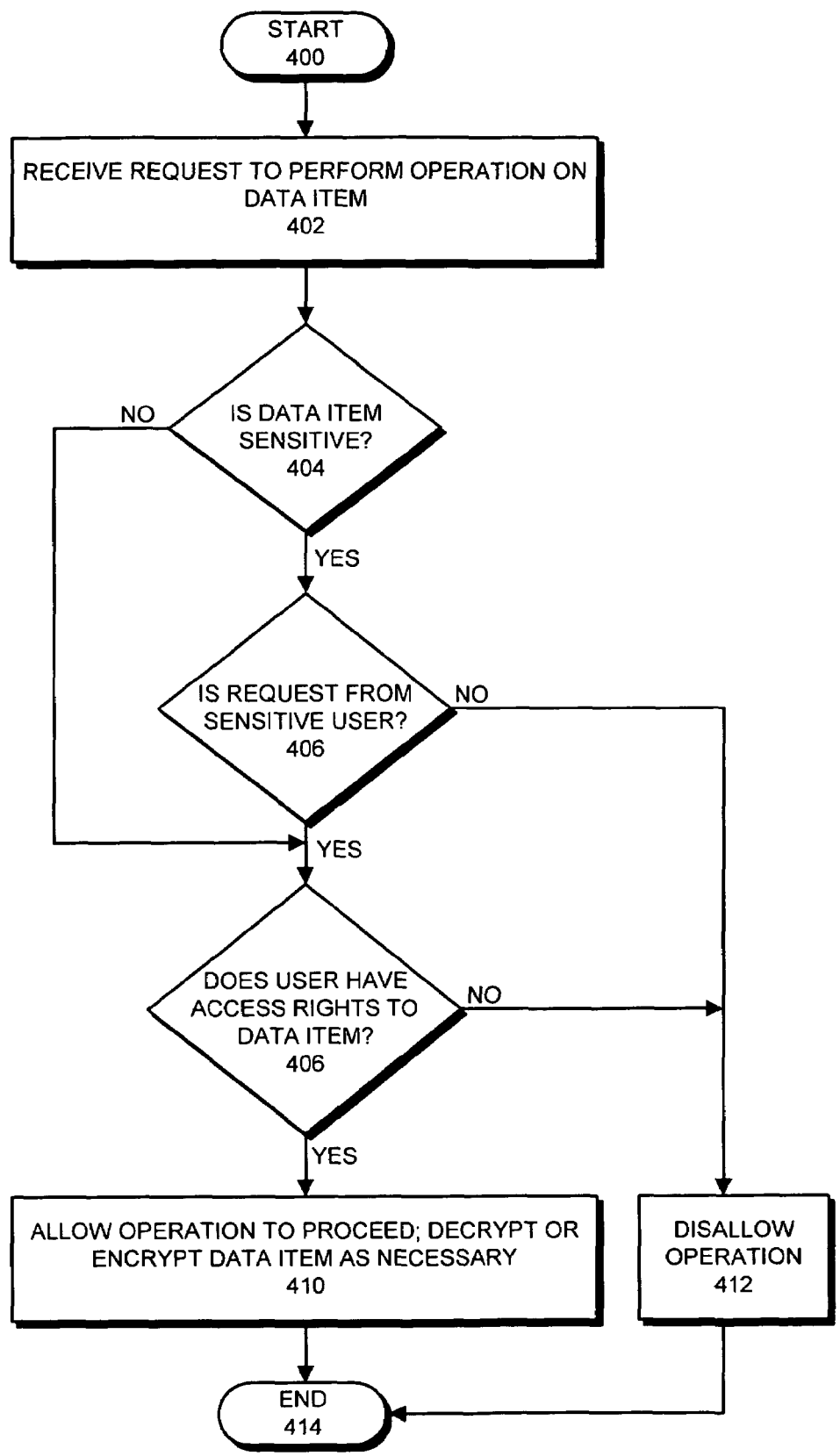
FIG. 4 is a flow chart illustrating how database operations are selectively performed in accordance with an embodiment of the present invention.

FIG. 4 is a flow chart illustrating how database operations are selectively performed in accordance with an embodiment of the present invention. The system first receives a request to perform an operation on a data item (step 402). Next, the system determines if the data item is a sensitive data item (step 404).

If the data item is a sensitive data item, the system next determines if the request originated from a sensitive user (step 406). If the request originated from a sensitive user, or if at step 404 the data item was determined to be not sensitive, the system determines if the user has access rights to the data item (as is done in normal database accesses) (step 408). The system then allows the operation to proceed, which may involve encrypting or decrypting the sensitive information, if necessary, in addition to normal query-related operations (step 410).

If at step 406 the request was not from a sensitive user, or if at step 408 the user does not have access rights to the data item, the system disallows the operation (step 412).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for managing a database system, wherein the database system includes one or more sensitive users having access to sensitive data, one or more normal users having access to non-sensitive data, one or more normal database administrators allowed to perform administrative functions over the normal user and non-sensitive data, and one or more security officers allowed to perform administrative functions over the sensitive user and sensitive data, the method comprising:

receiving a command to perform an administrative function on a user account within the database system;

determining if the user account belongs to a sensitive user who is empowered to access sensitive data in the database system;

if the user account does not belong to a sensitive user, and if the command is received from a normal database administrator for the database system, allowing the administrative function to proceed;

if the user account belongs to a sensitive user, and if the command is received from a normal database administrator, preventing the normal database administrator from performing the administrative function on the user account; and if the user account belongs to a sensitive user, and if the command is received from a security officer within the group of one or more security officers, performing the administrative function on the user account, wherein the one or more security officers are the only database administrators empowered to perform administrative functions on the user account.

2. The method of claim 1, further comprising:

receiving a request to perform an operation on a data item in the database system;

if the data item is a sensitive data item containing sensitive information and if the request is received from a sensitive user who is empowered to access sensitive data, allowing the operation to proceed if the sensitive user has access rights to the sensitive data item; and if the data item is a sensitive data item and the request is received from a user who is not a sensitive user, disallowing the operation.

3. The method of claim 2, wherein if the data item is a sensitive data item, if the operation is allowed to proceed, and if the operation involves retrieval of the data item, the method further comprises decrypting the data item using an encryption key after the data item is retrieved.

4. The method of claim 3, wherein the encryption key is stored along with a table containing the data item.

5. The method of claim 4, wherein the encryption key is stored in encrypted form.

6. The method of claim 1, wherein if the user is not a sensitive user, and if the command to perform the administrative function is received from a security officer, the method further comprises allowing the security officer to perform the administrative function on the user.

7. A computer-readable storage medium storing instructions that when executed by a computer cause the computer to perform a method for managing a database system, wherein the database system includes one or more sensitive users having access to sensitive data, one or more normal users having access to non-sensitive data, one or more normal database administrators allowed to perform administrative functions over the normal user and non-sensitive data, and one or more security officers allowed to perform administrative functions over the sensitive user and sensitive data, the method comprising:

receiving a command to perform an administrative function on a user account within the database system;

determining if the user account belongs to a sensitive user who is empowered to access sensitive data in the database system;

if the user account does not belong to a sensitive user, and if the command is received from a normal database administrator for the database system, allowing the administrative function to proceed;

if the user account belongs to a sensitive user, and if the command is received from a normal database administrator, preventing the normal database administrator from performing the administrative function on the user account; and if the user account belongs to a sensitive user, and if the command is received from a security officer within the group of one or more security officers, performing the administrative function on the user account, wherein the one or more security officers are the only database administrators empowered to perform administrative functions on the user account.

8. The computer-readable storage medium of claim 7, wherein the method further comprises:

receiving a request to perform an operation on a data item in the database system;

if the data item is a sensitive data item containing sensitive information and if the request is received from a sensitive user who is empowered to access sensitive data, allowing the operation to proceed if the sensitive user has access rights to the sensitive data item; and if the data item is a sensitive data item and the request is received from a user who is not a sensitive user, disallowing the operation.

9. The computer-readable storage medium of claim 8, wherein if the data item is a sensitive data item, if the operation is allowed to proceed, and if the operation involves retrieval of the data item, the method further comprises decrypting the data item using an encryption key after the data item is retrieved.

10. The computer-readable storage medium of claim 9, wherein the encryption key is stored along with a table containing the data item.

11. The computer-readable storage medium of claim 10, wherein the encryption key is stored in encrypted form.

12. The computer-readable storage medium of claim 7, wherein if the user is not a sensitive user, and if the command to perform the administrative function is received from a security officer, the method further comprises allowing the security officer to perform the administrative function on the user.

13. An apparatus that manages a database system, wherein the database system includes one or more sensitive users having access to sensitive data, one or more normal users having access to non-sensitive data, one or more normal database administrators allowed to perform administrative functions over the normal user and non-sensitive data, and one or more security officers allowed to perform administrative functions over the sensitive user and sensitive data, comprising:

a command-receiving mechanism configured to receive a command to perform an administrative function on a user account within the database system;

an execution mechanism configured to, determine if the user account belongs to a sensitive user who is empowered to access sensitive data in the database system;

allow the administrative function to proceed, if the user account does not belong to a sensitive user, and if the command is received from a normal database administrator for the database system;

prevent a normal database administrator from performing the administrative function on the user account, if the user account belongs to a sensitive user, and if the command is received from the normal database administrator; and to allow the administrative function to proceed, if the user account belongs to a sensitive user, and if the command is received from a security officer within the group of one or more security officers, wherein the one or more security officers are the only database administrators empowered to perform administrative functions involving sensitive users.

14. The apparatus of claim 13, wherein the command-receiving mechanism is configured to receive a request to perform an operation on a data item in the database system;

wherein the execution mechanism is configured to, allow the operation to proceed, if the data item is a sensitive data item containing sensitive information and if the request is received from a sensitive user who is empowered to access sensitive data, and if the sensitive user has access rights to the sensitive data item; and to disallowing the operation, if the data item is a sensitive data item, and the request is received from a user who is not a sensitive user.

15. The apparatus of claim 14, further comprising a decryption mechanism, wherein if the data item is a sensitive data item, if the operation is allowed to proceed, and if the operation involves retrieval of the data item, the decryption mechanism is configured to decrypt the data item using an encryption key after the data item is retrieved.

16. The apparatus of claim 15, wherein the encryption key is stored along with a table containing the data item.

17. The apparatus of claim 16, wherein the encryption key is stored in encrypted form.

18. The apparatus of claim 13, wherein if the user is not a sensitive user, and if the command to perform the administrative function is received from a security officer, the execution mechanism is configured to allow the security officer to perform the administrative function on the user.

* * * * *